United States Patent
Lee et al.

(10) Patent No.: US 10,887,828 B2
(45) Date of Patent: Jan. 5, 2021

(54) TECHNIQUES AND APPARATUSES FOR MOBILE NETWORK SEARCHING IN MULTIPLE RADIO ACCESS TECHNOLOGIES

(71) Applicant: QUALCOMM Incorporated, San Diego, CA (US)

(72) Inventors: Kuo-Chun Lee, San Diego, CA (US); Srinivasan Balasubramanian, San Diego, CA (US); Arvind Santhanam, San Diego, CA (US); Shan Qing, San Diego, CA (US); Xiaoning Lu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/052,333

(22) Filed: Aug. 1, 2018

(65) Prior Publication Data

US 2019/0069226 A1 Feb. 28, 2019

Related U.S. Application Data

(60) Provisional application No. 62/549,906, filed on Aug. 24, 2017.

(51) Int. Cl.
*H04W 4/00* (2018.01)
*H04W 48/16* (2009.01)
(Continued)

(52) U.S. Cl.
CPC ............ *H04W 48/16* (2013.01); *H04B 17/30* (2015.01); *H04W 24/10* (2013.01); *H04W 48/18* (2013.01);
(Continued)

(58) Field of Classification Search
None
See application file for complete search history.

(56) References Cited

U.S. PATENT DOCUMENTS

2012/0034917 A1  2/2012  Kazmi
2014/0066061 A1  3/2014  Lou et al.
(Continued)

FOREIGN PATENT DOCUMENTS

| EP | 2422550 A1 | 2/2012 |
| WO | 2017127126 A1 | 7/2017 |
| WO | WO-2018029513 A1 * | 2/2018 ............ H04W 48/18 |

OTHER PUBLICATIONS

International Search Report and Written Opinion—PCT/US2018/044999—ISA/EPO—dated Oct. 9, 2018.
(Continued)

*Primary Examiner* — Zewdu A Beyen
(74) *Attorney, Agent, or Firm* — Harrity & Harrity, LLP

(57) ABSTRACT

Certain aspects of the present disclosure generally relate to wireless communication. In some aspects, a user equipment may determine a mode in which the user equipment is enabled, wherein the mode is one of a non-standalone mode, a standalone mode, or a standalone mode and a non-standalone mode; determine whether to prioritize a first set of frequencies associated with a first radio access technology (RAT) or a second set of frequencies associated with a second RAT based at least in part on the mode in which the user equipment is enabled, wherein the first RAT is different from the second RAT; and perform a search of the first set of frequencies or the second set of frequencies based at least in part on whether the first set of frequencies or the second set of frequencies is prioritized. Numerous other aspects are provided.

30 Claims, 8 Drawing Sheets

(51) Int. Cl.
  *H04W 48/18* (2009.01)
  *H04B 17/30* (2015.01)
  *H04W 24/10* (2009.01)
  *H04W 72/10* (2009.01)
  *H04W 88/06* (2009.01)
  *H04W 72/04* (2009.01)

(52) U.S. Cl.
  CPC ........... *H04W 72/10* (2013.01); *H04W 88/06* (2013.01); *H04W 72/0453* (2013.01)

(56) References Cited

U.S. PATENT DOCUMENTS

| | | | |
|---|---|---|---|
| 2015/0271847 A1 | 9/2015 | Luo et al. | |
| 2017/0111886 A1* | 4/2017 | Kim | H04W 72/042 |
| 2017/0181198 A1* | 6/2017 | Saraf | H04W 76/40 |
| 2017/0208592 A1 | 7/2017 | Rico Alvarino et al. | |
| 2017/0332357 A1 | 11/2017 | Xu et al. | |
| 2018/0041257 A1 | 2/2018 | Chen et al. | |

OTHER PUBLICATIONS

Qualcomm Incorporated, et al., "NR Available Indicator for NR Non-Standalone Architecture (Option 3/7)", 3GPP Draft; S2-174465-5G UI Indicator-R4, 3rd Generation Partnership Project (3GPP), Mobile Competence Centre; 650, Route Des Lucioles; F-06921 Sophia-Antipolis Cedex; France, vol. SA WG2, no. San Jose Del Cabo, Mexico; Jun. 26, 2017-Jun. 30, 2017, Jun. 25, 2017 (Jun. 25, 2017), 10 Pages, XP051303313, Retrieved from the internet: URL: http://www.3gpp.org/ftp/Meetings_3GPP_SYNC/SA2/Docs/ [retrieved on Jun. 25, 2017].

* cited by examiner

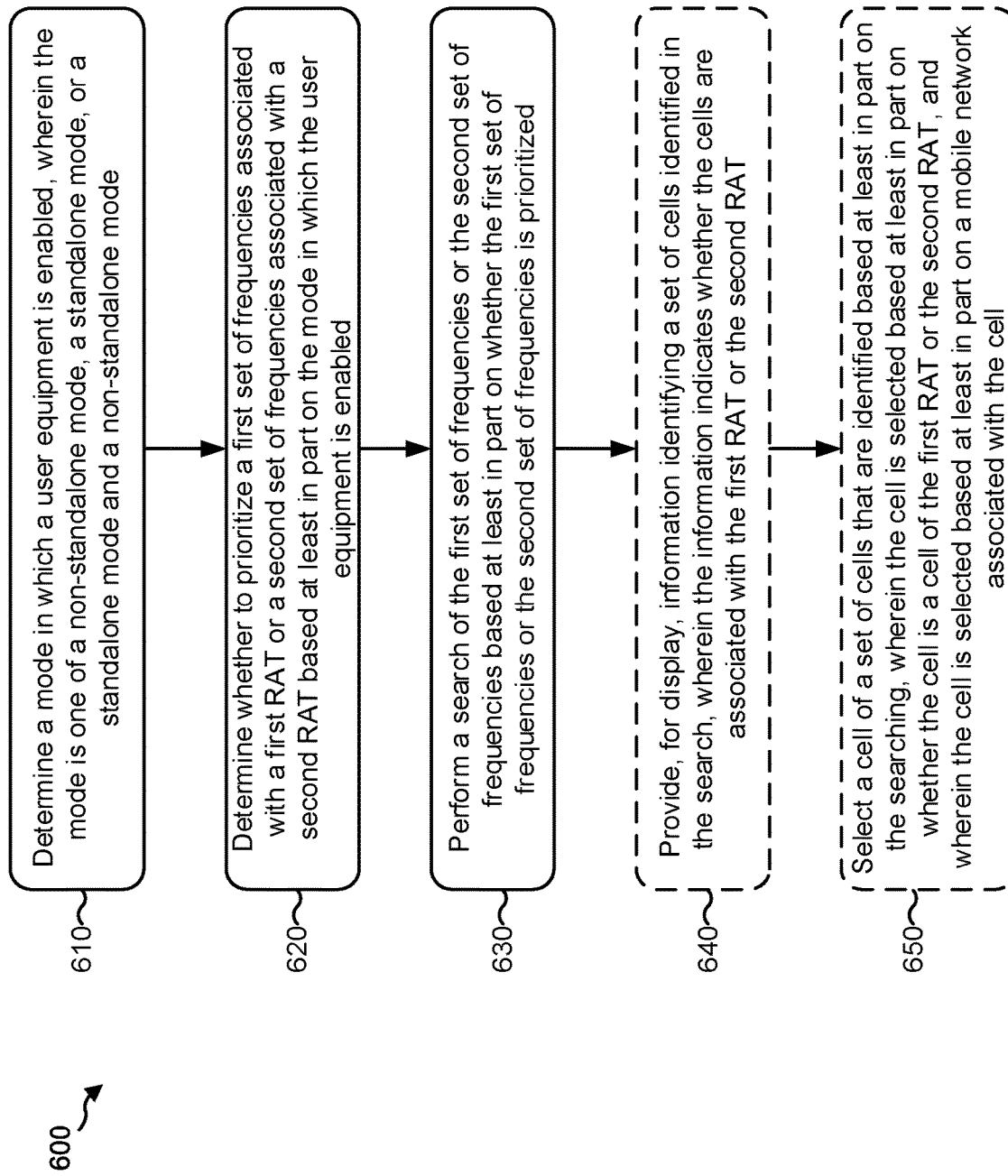

TECHNIQUES AND APPARATUSES FOR MOBILE NETWORK SEARCHING IN MULTIPLE RADIO ACCESS TECHNOLOGIES

CROSS-REFERENCE TO RELATED APPLICATIONS UNDER 35 U.S.C. § 119

This application claims priority to Provisional Patent Application No. 62/549,906, filed on Aug. 24, 2017, entitled "TECHNIQUES AND APPARATUSES FOR MOBILE NETWORK SEARCHING IN MULTIPLE RADIO ACCESS TECHNOLOGIES," which is hereby expressly incorporated by reference herein.

FIELD OF THE DISCLOSURE

Aspects of the present disclosure generally relate to wireless communication, and more particularly to techniques and apparatuses for mobile network searching in multiple radio access technologies (RATs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the user equipment (UE) to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication performed by a user equipment may include determining a mode in which the user equipment is enabled, wherein the mode is one of a non-standalone mode, a standalone mode, or a standalone mode and a non-standalone mode; determining whether to prioritize a first set of frequencies associated with a first radio access technology (RAT) or a second set of frequencies associated with a second RAT based at least in part on the mode in which the user equipment is enabled, wherein the first RAT is different from the second RAT; and/or performing a search of the first set of frequencies or the second set of frequencies based at least in part on whether the first set of frequencies or the second set of frequencies is prioritized.

In some aspects, a user equipment for wireless communication may include memory and one or more processors operatively coupled to the memory. The memory and the one or more processors may be configured to determine a mode in which the user equipment is enabled, wherein the mode is one of a non-standalone mode, a standalone mode, or a standalone mode and a non-standalone mode; determine whether to prioritize a first set of frequencies associated with a first RAT or a second set of frequencies associated with a second RAT based at least in part on the mode in which the user equipment is enabled, wherein the first RAT is different from the second RAT; and/or perform a search of the first set of frequencies or the second set of frequencies based at least in part on whether the first set of frequencies or the second set of frequencies is prioritized.

In some aspects, a non-transitory computer-readable medium may store one or more instructions for wireless communication. The one or more instructions, when executed by one or more processors of a user equipment, may cause the one or more processors to determine a mode in which the user equipment is enabled, wherein the mode is one of a non-standalone mode, a standalone mode, or a standalone mode and a non-standalone mode; determine whether to prioritize a first set of frequencies associated with a first RAT or a second set of frequencies associated with a second RAT based at least in part on the mode in which the user equipment is enabled, wherein the first RAT is different from the second RAT; and/or perform a search of the first set of frequencies or the second set of frequencies based at least in part on whether the first set of frequencies or the second set of frequencies is prioritized.

In some aspects, an apparatus for wireless communication may include means for determining a mode in which the apparatus is enabled, wherein the mode is one of a non-standalone mode, a standalone mode, or a standalone mode and a non-standalone mode; means for determining whether to prioritize a first set of frequencies associated with a first RAT or a second set of frequencies associated with a second RAT based at least in part on the mode in which the apparatus is enabled, wherein the first RAT is different from the second RAT; and/or means for performing a search of the first set of frequencies or the second set of frequencies based at least in part on whether the first set of frequencies or the second set of frequencies is prioritized.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
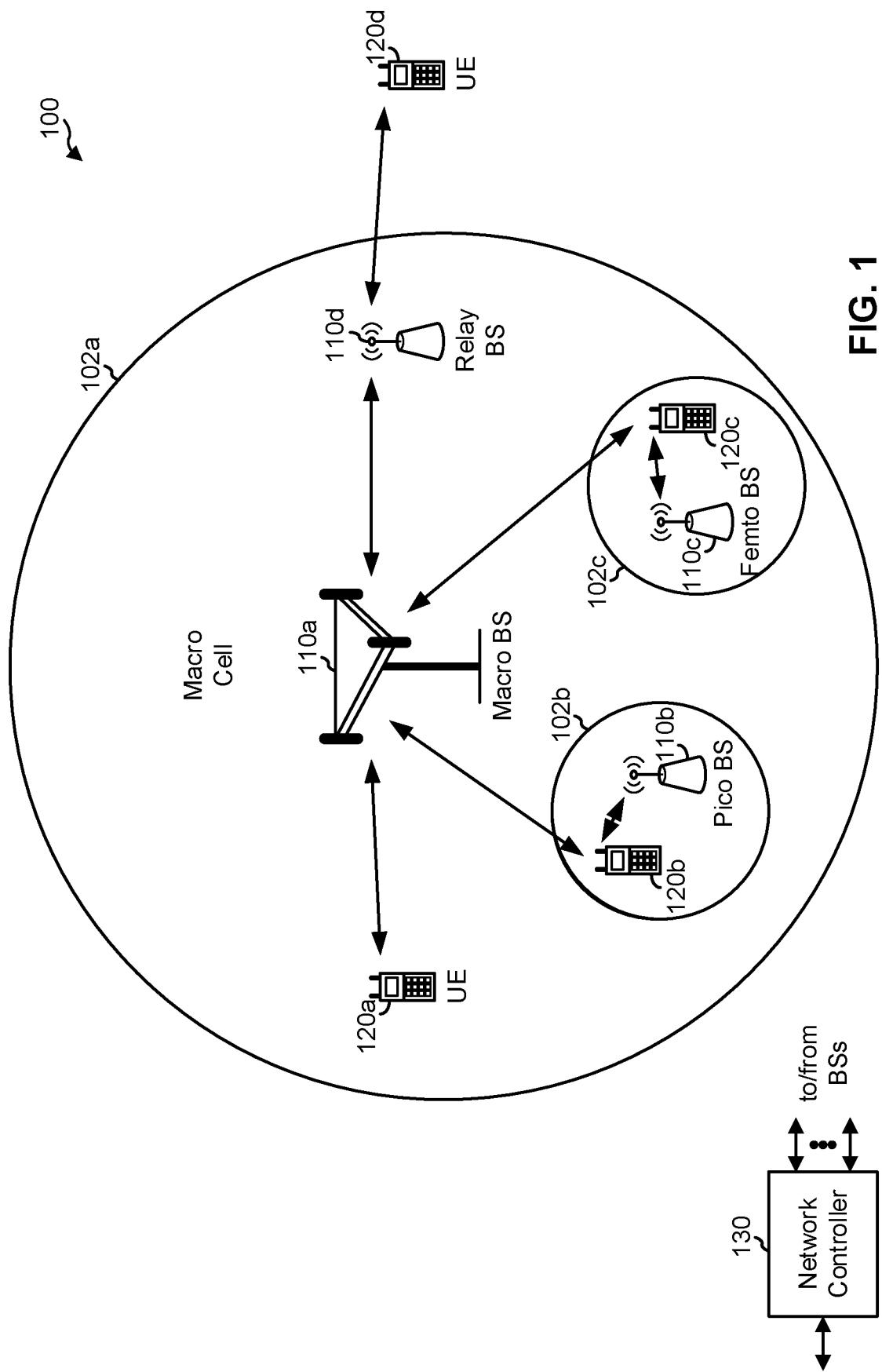
FIG. 1 is a block diagram conceptually illustrating an example of a wireless communication network, in accordance with certain aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or an SAtellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
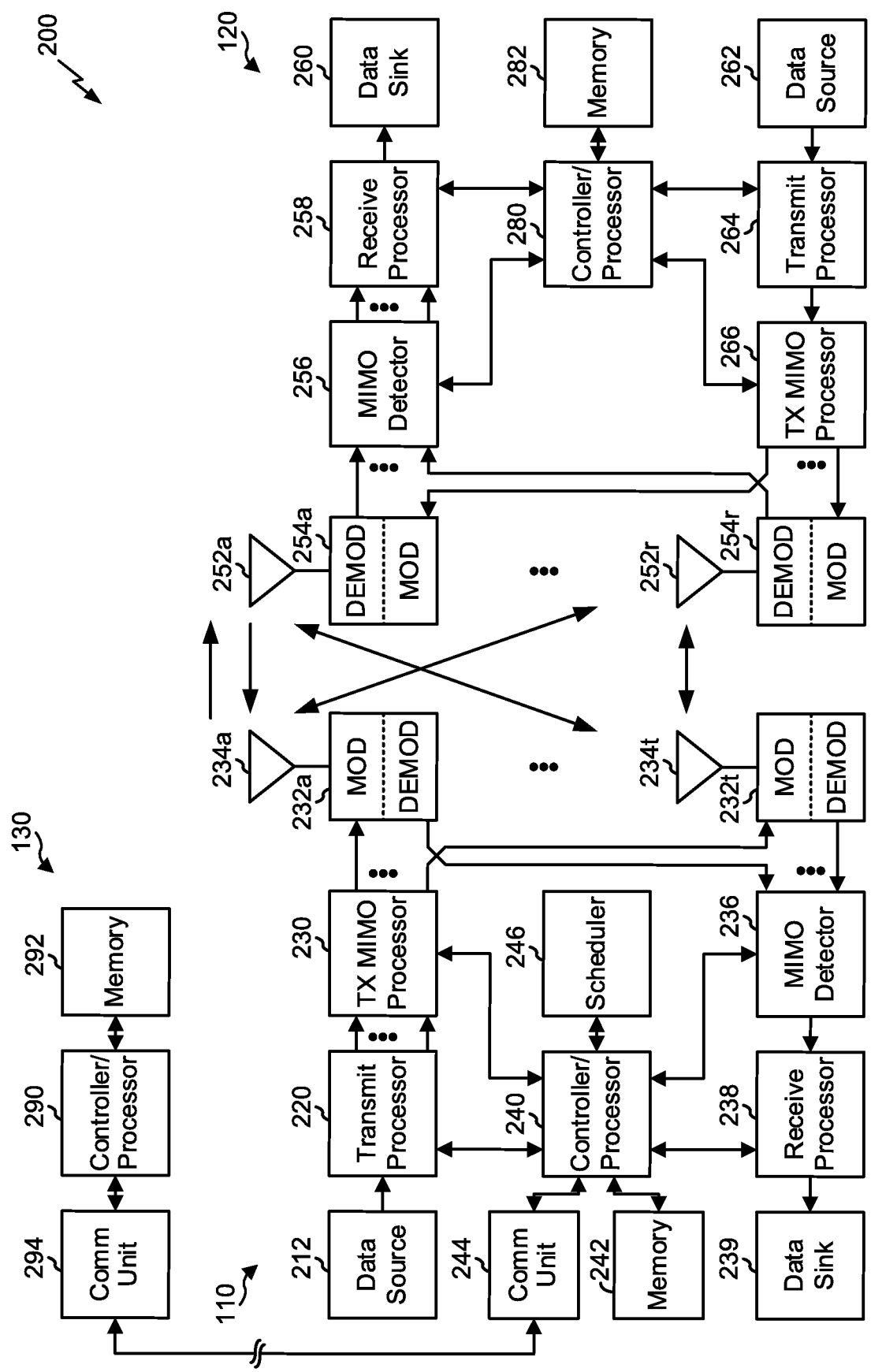
FIG. 2 is a block diagram conceptually illustrating an example of a base station in communication with a user equipment (UE) in a wireless communication network, in accordance with certain aspects of the present disclosure.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general $T \geq 1$ and $R \geq 1$.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at BS 110 and UE 120, respectively, to perform mobile network searching in multiple RATs. For example, controller/processor 280 and/or other processors and modules at UE 120, may perform or direct operations of UE 120 to perform mobile network searching in multiple RATs. For example, controller/processor 280 and/or other controllers/processors and modules at UE 120 may perform or direct operations of, for example, process 600 of FIG. 6 and/or other processes as described herein. In some aspects, one or more of the components shown in FIG. 2 may be employed to perform example process 600 and/or other processes for the techniques described herein. Memories 242 and 282 may store data and program codes for BS 110 and UE 120, respectively. A scheduler 246 may schedule UEs for data transmission on the downlink and/or uplink.

In some aspects, UE 120 may include means for determining a mode in which the UE 120 is enabled, means for determining whether to prioritize a first set of frequencies associated with a first RAT or a second set of frequencies associated with a second RAT based at least in part on the mode in which the UE 120 is enabled, means for performing a search of the first set of frequencies or the second set of frequencies based at least in part on whether the first set of frequencies or the second set of frequencies is prioritized, means for providing, for display, information identifying a set of cells identified in the search, means for selecting a cell of a set of cells that are identified based at least in part on the searching, and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3:
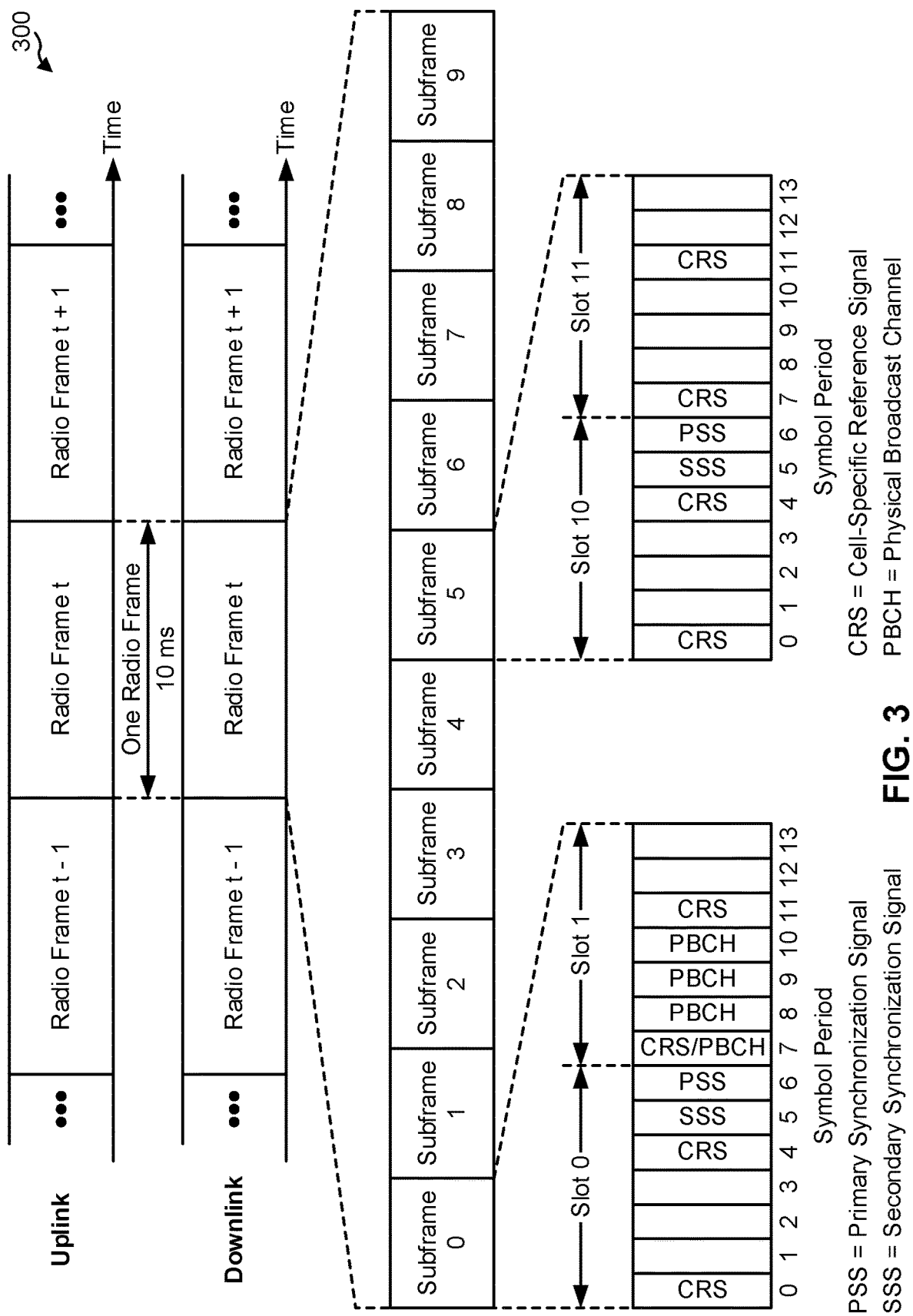
FIG. 3 is a block diagram conceptually illustrating an example of a frame structure in a wireless communication network, in accordance with certain aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
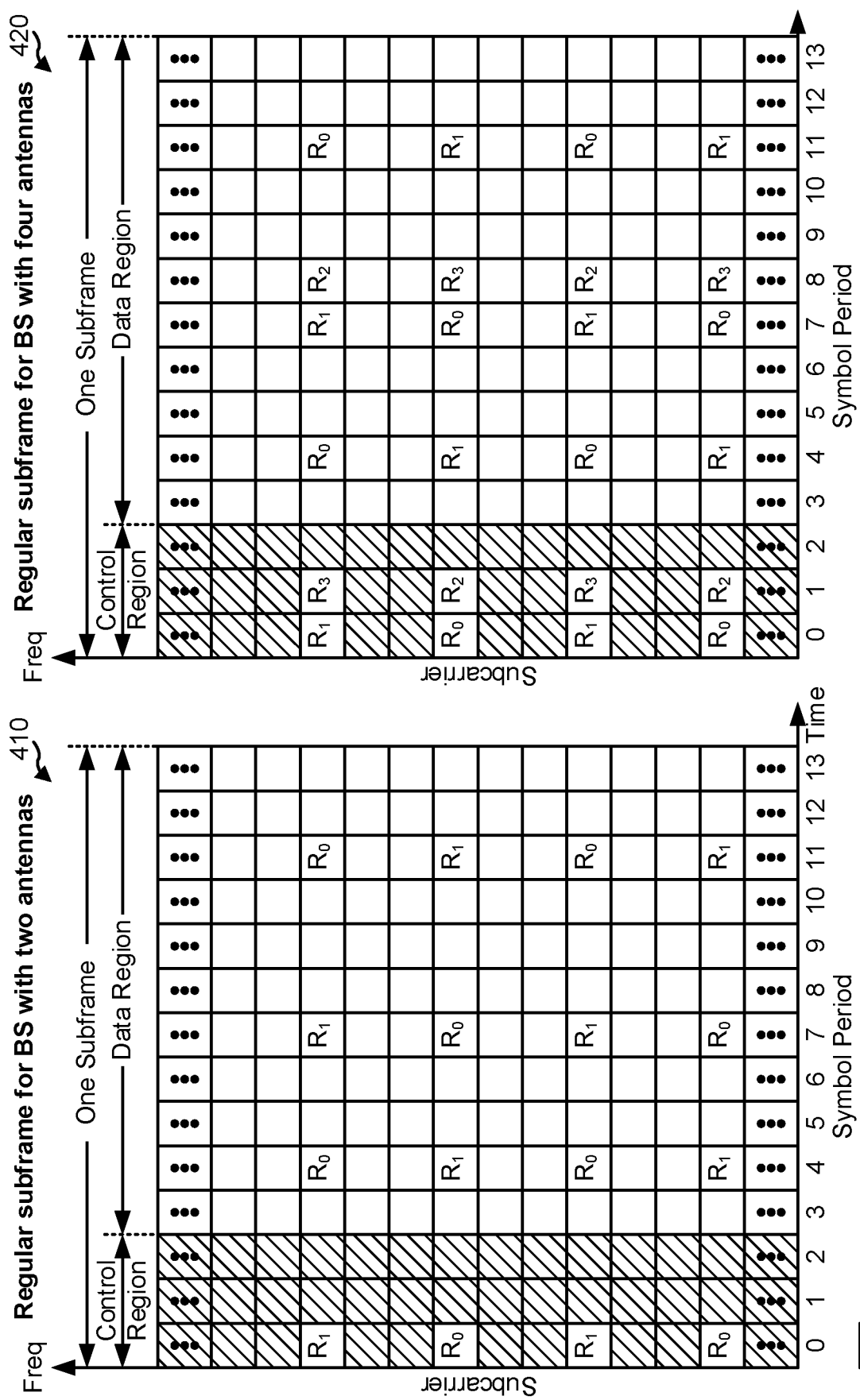
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification (TS) 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The radio access network (RAN) may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

A UE that is roaming to a visited public land mobile network (PLMN), or to a lower-priority PLMN than a home PLMN of the UE, may perform a search to identify a better PLMN to which to connect. Such a search may be termed a better PLMN (BPLMN) search. This search may return a list of results, which the UE may provide to a user for selection of a PLMN to which to connect. Additionally, or alternatively, the UE may select a better PLMN according to a priority system for PLMN selection.

As 5G/NR is implemented, a UE may use a non-standalone (NSA) mode of a LTE-NR dual connectivity (DC) configuration of the UE. In NSA mode, the UE may connect to a 4G/LTE cell as a master cell group (MCG), and may connect to the a different cell using a 5G/NR RAT as a secondary cell group (SCG). For example, to support NSA mode, an LTE eNB may broadcast a "5G available" indication when the LTE eNB can provide a 5G connection (e.g., LTE-NR dual connectivity) to a 5G/NR cell and there is a neighbor 5G/NR cell. For example, the "5G available" indication can be a flag in LTE SIB2 (e.g., an upperLayer-Indication IE). Alternatively, the "5G available" indication can be one or more NR frequency channel numbers (e.g., an Absolute Radio Frequency Channel Number) included in a LTE SIB2N, and a 5G/NR cell on the indicated NR frequency can support SCG in LTE-NR DC. As implementation of 5G/NR continues, some UEs may use a standalone mode (SA mode) wherein the UE connects to a 5G/NR cell without a MCG connection to a 4G/LTE cell. Additionally, a UE may opportunistically use NSA mode and SA mode based at least in part on cells available to the UE.

A UE may prioritize certain frequencies for a better PLMN (BPLMN) search, which may be a search for a higher priority PLMN. However, the set of frequencies to be prioritized for a 5G/NR UE (e.g., a UE using SA mode) may not be the same as a set of frequencies to be prioritized for a 4G/LTE UE (e.g., a UE using NSA mode). Furthermore, certain difficulties may arise when presenting information about available PLMNs to a user, especially when the PLMNs can be associated with different RATs. Still further, a UE may need to select cells based at least in part on different criteria for an SA mode in comparison to an NSA mode.

Some techniques and apparatuses described herein identify frequencies to be prioritized for a UE's BPLMN search based at least in part on whether the UE is in an SA mode, an NSA mode, or an SA mode and an NSA mode. Furthermore, some techniques and apparatuses described herein provide for display information identifying a RAT associated with each PLMN or cell identified as part of a BPLMN search. Still further, some techniques and apparatuses described herein provide automatic selection of a cell or PLMN based at least in part on a RAT associated with the cell or PLMN. Thus, PLMN searching in a multi-RAT environment is improved, which may improve utilization of network resources and performance of the wireless network.

Figure 5A:
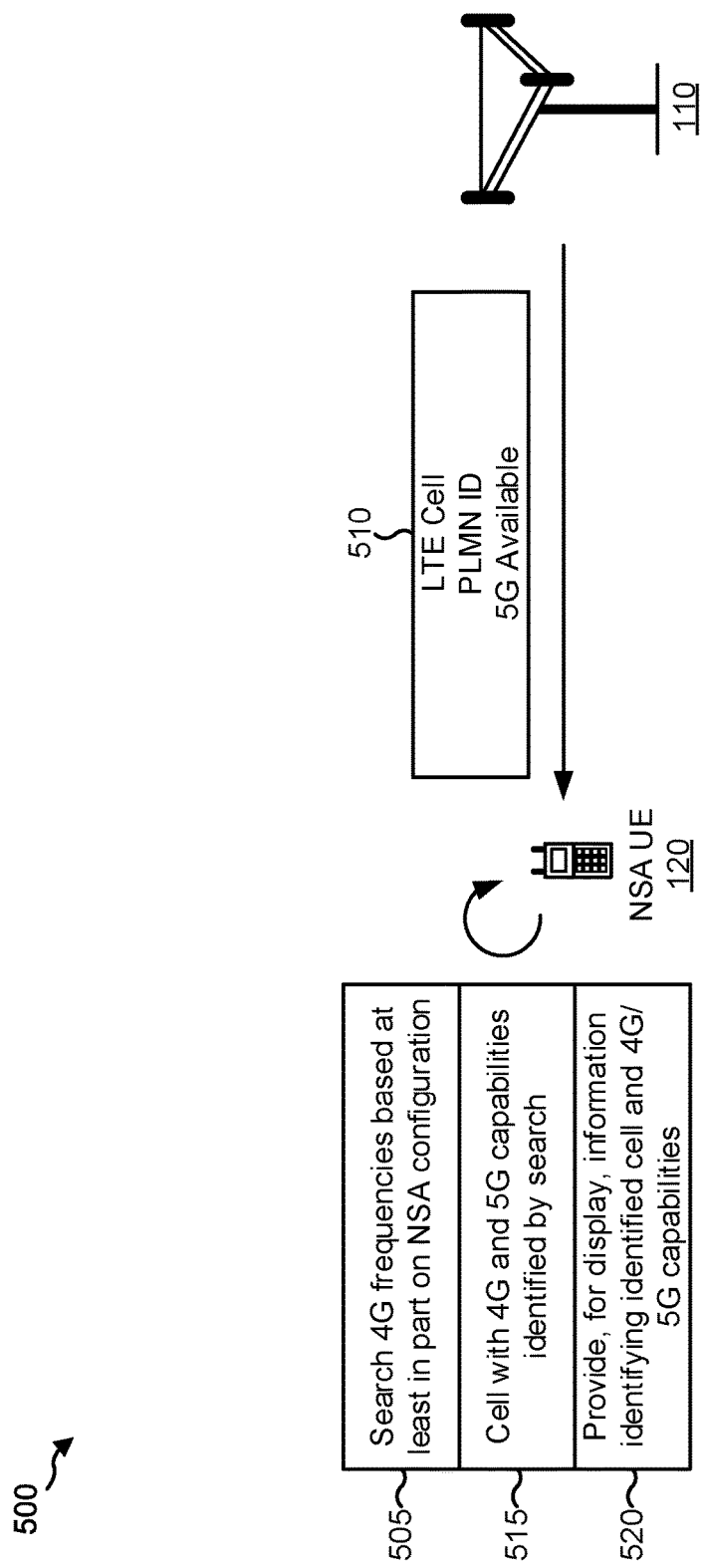
FIGS. 5A-5C are diagrams illustrating examples of mobile network searching in multiple RATs, in accordance with various aspects of the present disclosure.
Figure 5B:
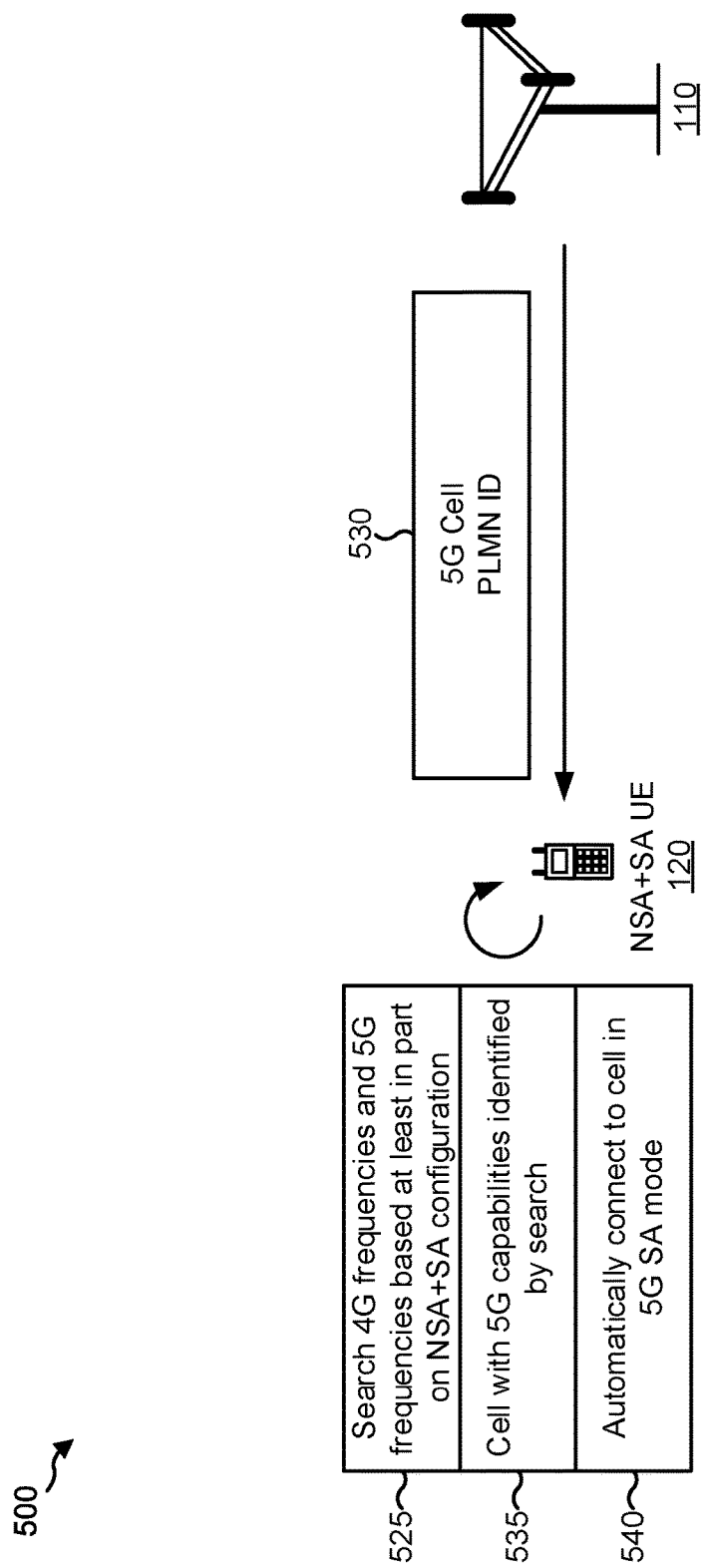
Figure 5C:
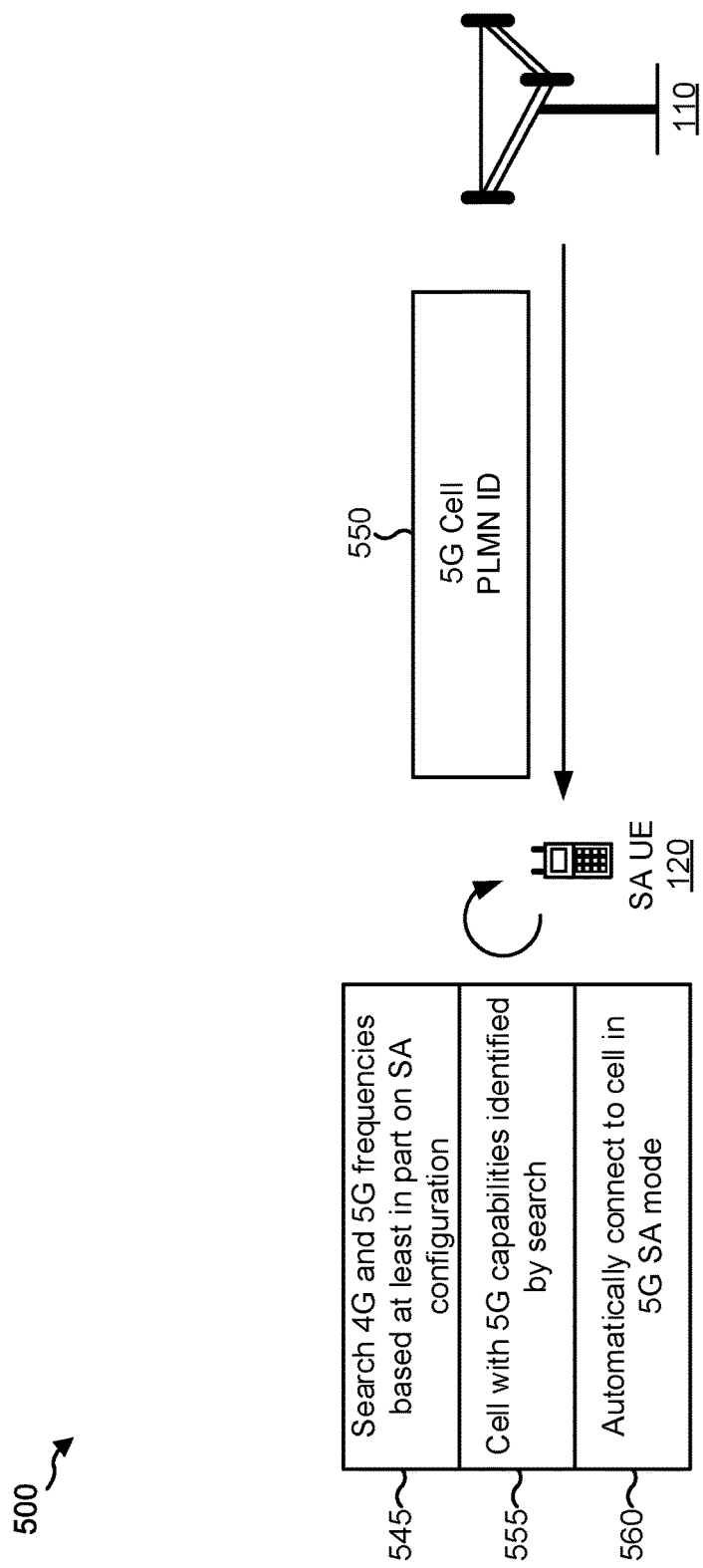

FIGS. 5A-5C are diagrams illustrating examples 500 of mobile network searching in multiple RATs, in accordance with various aspects of the present disclosure.

FIG. 5A is an example wherein an NSA UE 120 (e.g., a UE 120 enabled in NSA mode) performs a BPLMN search and identifies cells based at least in part on the BPLMN search. As shown in FIG. 5A, and by reference number 505, the UE 120 may search a set of 4G frequencies based at least in part on the UE 120 being enabled in the NSA mode. The UE 120 may search the set of 4G frequencies because, when communicating in NSA mode, an LTE cell may provide a 5G connection using dual connectivity. Therefore, the UE 120 may search in a set of 4G frequencies for an LTE cell that provides a 5G connection. In some aspects, the UE 120 may prioritize the set of 4G frequencies based at least in part on being enabled in the NSA mode. For example, the UE 120 may search the set of 4G frequencies before searching other frequencies, or may not search other frequencies. In some aspects, the frequencies may be provisioned by a PLMN operator as part of an acquisition database.

As shown by reference number 510, the UE 120 may identify a BS 110 based at least in part on the search. As further shown, the BS 110 may provide an LTE cell with a particular PLMN identifier (PLMN ID). As shown, the LTE cell may be associated with a 5G connection. For example, the BS 110 may provide information indicating that 5G is available via the LTE cell. In some aspects, the information may include a system information block and/or any other form of information indicating that the 5G connection is available via the LTE cell.

As shown by reference number 515, the UE 120 may identify the cell associated with the 4G/LTE and 5G/NR capabilities based at least in part on the search. In some aspects, the cell may be one of a plurality of cells identified by the UE 120. In such a case, the UE 120 may identify a respective PLMN identifier of each cell and 4G and/or 5G capabilities of each cell.

As shown by reference number 520, the UE 120 may provide, for display, information identifying the cell and the 4G and/or 5G capabilities associated with the cell. For example, the UE 120 may provide information identifying the PLMN identifier of the cell, and may provide a visual indicator (e.g., an icon) indicating that the cell is an LTE cell with 5G capabilities. When the UE 120 identifies a plurality of cells during the search, the UE 120 may provide respective PLMN identifiers and information identifying 4G and/or 5G capabilities of each cell. A user may select a cell to which the UE 120 is to connect, and the UE 120 may perform a connection procedure with regard to the selected cell. In this way, a BPLMN search is improved by identifying and providing information related to 5G capabilities using a search based at least in part on an NSA mode of the UE 120.

In some aspects, if any cell with 4G and 5G capabilities is identified, the UE 120 may provide for display information identifying the cell. If no cell with 4G and 5G capabilities is identified, the UE 120 may provide for display information identifying one or more 4G cells that were identified as part of the search.

In some aspects, the UE 120 may automatically select a cell and/or PLMN based at least in part on the search. The UE 120 may automatically select a cell when the UE 120 stores information indicating that a PLMN of the cell is preferred for connection. For example, the PLMN may be a home PLMN of the UE 120 and/or the like. In other words, the UE 120 may select the cell based at least in part on a mobile network associated with the cell. In some aspects, when the UE 120 is enabled in an NSA mode, a cell with 4G and 5G capabilities may be prioritized over a cell that only has 4G capabilities. Further, a cell that only has 5G capabilities may not be considered for cell selection.

FIG. 5B is an example wherein an NSA+SA UE 120 (e.g., a UE 120 enabled in NSA mode and SA mode) performs a BPLMN search and identifies cells based at least in part on the BPLMN search. An NSA+SA UE 120 may use an NSA connection when available (e.g., when a cell with 4G and 5G capabilities is available), and may use an SA 5G connection when no NSA connection is available. Additionally, or alternatively, an NSA+SA UE 120 may use an SA 5G connection when one is available (e.g., from a 5G cell), and may use an NSA connection when no SA 5G connection is available.

As shown by reference number 525, the UE 120 may search 4G and 5G frequencies based at least in part on the UE 120 being an NSA+SA UE 120. For example, the UE 120 may search the 4G and 5G frequencies at an equal priority level. In some aspects, the UE 120 may search one of the sets of frequencies at a higher priority level than the other set of frequencies. For example, the UE 120 may search the 5G frequencies at a higher priority level than the 4G frequencies. The UE 120 may search both sets of frequencies because the UE 120 is capable of using an NSA connection and an SA connection, which enables the UE 120 to establish an SA 5G connection.

As shown by reference number 530, the UE 120 may receive information identifying a 5G cell provided by a BS 110. For example, the 5G cell may be a cell that is not associated with an LTE connection. As further shown, the UE 120 may receive a PLMN identifier of the 5G cell. As shown by reference number 535, the UE 120 may identify the cell based at least in part on the received information. For example, the UE 120 may identify the cell and the 5G capability of the cell based at least in part on the search. In some aspects, the UE 120 may identify multiple different cells based at least in part on the search.

As shown by reference number 540, the UE 120 may automatically connect to the cell in the 5G SA mode. For example, the UE 120 may select the cell for connection in the 5G SA mode. In some aspects, the UE 120 may select the cell from multiple, different cells identified as part of the search. For example, the UE 120 may use an equal priority level for 5G cells and LTE cells with 5G capabilities, and may use a lower priority level for LTE cells without 5G capabilities.

In some aspects, the UE 120 may provide, for display, information identifying one or more cells identified as part of the search. When the UE 120 is enabled in an NSA+SA mode, and when a cell is a 5G cell or an LTE cell with 5G capabilities, the UE 120 may provide, for display, information indicating that the cell has 5G capabilities. When the cell does not have 5G capabilities, the UE 120 may provide information indicating that the cell has LTE capabilities (and not 5G capabilities).

FIG. 5C is an example wherein an SA UE 120 (e.g., a UE 120 enabled in SA mode) performs a BPLMN search and identifies cells based at least in part on the BPLMN search. SA mode is a mode wherein the UE 120 will only connect to an LTE cell without 5G capabilities or a 5G cell. In other words, in SA mode, the UE 120 will not connect to an LTE cell with 5G capabilities.

As shown in FIG. 5C, and by reference number 545, the UE 120 may search a set of frequencies associated with 4G and a set of frequencies associated with 5G based at least in part on the UE 120 being enabled in an SA mode. For example, the UE 120 may prioritize the set of frequencies associated with 5G. In some aspects, the UE 120 may only search the set of frequencies associated with 5G.

As shown by reference number 550, the UE 120 may receive information identifying a 5G cell from BS 110, and may receive a PLMN identifier for the 5G cell from BS 110. In some aspects, the UE 120 may receive information identifying a 4G/LTE cell provided by BS 110, such as an LTE cell without 5G capabilities.

As shown by reference number 555, the UE 120 may identify the 5G cell based at least in part on the information, as described in more detail elsewhere herein. In some aspects, the UE 120 may identify multiple cells, such as one or more LTE cells without 5G capabilities and one or more 5G cells.

As shown by reference number 560, the UE 120 may automatically connect to the cell in the 5G SA mode, as described in more detail herein. In some aspects, the UE 120 may automatically select the cell for connection. For example, when the UE 120 is enabled in SA mode, the UE 120 may prioritize connecting to a 5G cell, and may fall back to connecting to an LTE cell when no 5G cell is available. In SA mode, the UE 120 may not consider whether an LTE cell is associated with 5G capabilities.

In some aspects, the UE 120 may provide information identifying one or more cells for display. For example, when a cell is a 5G cell, the UE 120 may provide information identifying the cell as associated with a 5G capability. When the cell is an LTE cell without 5G capabilities, the UE 120 may provide information identifying the cell as associated with a 4G or LTE capability. In this way, the UE 120 provides information identifying 5G cells and/or LTE cells for selection of a suitable cell for connection.

As indicated above, FIGS. 5A-5C are provided as examples. Other examples are possible and may differ from what was described with respect to FIGS. 5A-5C.

FIG. 6 is a diagram illustrating an example process 600 performed, for example, by a UE, in accordance with various aspects of the present disclosure. Example process 600 is an example where a user equipment (e.g., UE 120) performs mobile network searching in multiple RATs.

As shown in FIG. 6, in some aspects, process 600 may include determining a mode in which a user equipment is enabled, wherein the mode is one of a non-standalone mode, a standalone mode, or a standalone mode and a non-standalone mode (block 610). For example, the user equipment may determine a mode in which the user equipment is enabled. The mode may be one of a non-standalone mode, a standalone, or a standalone mode and a non-standalone mode, as described in more detail elsewhere herein.

As shown in FIG. 6, in some aspects, process 600 may include determining whether to prioritize a first set of frequencies associated with a first RAT or a second set of frequencies associated with a second RAT based at least in part on the mode in which the user equipment is enabled (block 620). For example, the user equipment may determine whether to prioritize a first set of frequencies or a second set of frequencies for a PLMN search, such as a better PLMN search. The first set of frequencies may be associated with a first RAT, such as LTE or 4G. The second set of frequencies may be associated with a second RAT, such as 5G or NR. The user equipment may determine whether to prioritize the first set or the second set based at least in part on the mode in which the user equipment is enabled, as described in more detail elsewhere herein.

As shown in FIG. 6, in some aspects, process 600 may include performing a search of the first set of frequencies or the second set of frequencies based at least in part on whether the first set of frequencies or the second set of frequencies is prioritized (block 630). For example, the user equipment may perform a search of at least one of the first set of frequencies or the second set of frequencies based at least in part on which set of frequencies is prioritized. In some aspects, the user equipment may perform a search prioritizing 4G/LTE frequencies (e.g., in NSA mode). In some aspects, the user equipment may perform a search with equal priority for 4G/LTE frequencies and 5G/NR frequencies (e.g., in NSA and SA mode). In some aspects, the user equipment may perform a search prioritizing 5G/NR frequencies (e.g., in SA mode).

As shown in FIG. 6, in some aspects, process 600 may include providing, for display, information identifying a set of cells identified in the search, wherein the information indicates whether the set of cells are associated with the first RAT or the second RAT (block 640). For example, the user equipment may provide, for display, information identifying a set of cells identified in the search, for a user to select a cell or PLMN to which to connect. In some aspects, the information may be in the form of a list. The information may indicate whether the set of cells are associated with the first RAT or the second RAT. For example, each cell may be associated with a visual indication of whether the cell is associated with a 4G/LTE RAT or a 5G/NR RAT. In some aspects, the information indicates one or more cellular providers associated with the set of cells (e.g., a cellular provider of each cell, whether each cell is a roaming cell for the UE, and/or the like). In some aspects, the information is provided in a particular order based at least in part on the mode in which the user equipment is enabled or a possible mode in which the user equipment can be enabled. For example, when the UE is enabled in an NSA+SA mode or an SA mode, 5G/NR cells may be provided before LTE cells in the list. As another example, when the UE is enabled in an NSA+SA mode or an SA mode, 5G/NR cells associated with a cellular provider of the UE may be provided before other cells in the list.

As shown in FIG. 6, in some aspects, process 600 may include selecting a cell of a set of cells that are identified based at least in part on the searching, wherein the cell is selected based at least in part on whether the cell is a cell of the first RAT or a cell of the second RAT, and wherein the cell is selected based at least in part on a mobile network associated with the cell (block 650). For example, the user equipment may (e.g., automatically, without user input) select a cell or PLMN to which to connect. The cell may be selected based at least in part on a PLMN associated with the cell, as described in more detail elsewhere herein.

In some aspects, the first RAT is a Long Term Evolution RAT, and wherein the search is performed for the first set of frequencies and not the second set of frequencies based at least in part on the user equipment being enabled for the non-standalone mode.

In some aspects, the first RAT is a Long Term Evolution RAT and the second RAT is a New Radio RAT, and wherein the search is performed for the first set of frequencies and the second set of frequencies based at least in part on the user equipment being enabled for the non-standalone mode and the standalone mode.

In some aspects, the first RAT is a New Radio RAT, and wherein the search is performed for the first set of frequencies before the second set of frequencies based at least in part on the user equipment being enabled for the standalone mode.

In some aspects, the first RAT is a Long Term Evolution RAT, the second RAT is a New Radio RAT, and the user equipment is enabled for the non-standalone mode, and, when a particular cell of the set of cells is a Long Term Evolution cell that uses the New Radio RAT, the information indicates that the particular cell is a Long Term Evolution cell that is associated with the New Radio RAT based at least in part on the user equipment being enabled for the non-standalone mode.

In some aspects, the first RAT is a Long Term Evolution RAT, the second RAT is a New Radio RAT, and the user equipment is enabled for the non-standalone mode and the standalone mode, and a particular cell of the set of cells is at least one of an LTE cell that uses the New Radio RAT or a New Radio cell. In such a case, the information may indicate that the particular cell is associated with the New Radio RAT based at least in part on the user equipment being enabled for the non-standalone mode and the standalone mode.

In some aspects, the first RAT is a Long Term Evolution RAT, the second RAT is a New Radio RAT, and the user equipment is enabled for the standalone mode, a particular cell of the set of cells is a New Radio cell, and the information indicates that the particular cell is associated with the New Radio RAT based at least in part on the user equipment being enabled for the standalone mode.

In some aspects, the cell is selected based at least in part on whether the user equipment is enabled for the non-standalone mode, the standalone mode, or the standalone mode and the non-standalone mode In some aspects, the first RAT is a Long Term Evolution RAT, the second RAT is a New Radio RAT, and the user equipment is enabled for the non-standalone mode, and the cell is selected based at least in part on the cell being a Long Term Evolution cell that is associated with the New Radio RAT.

In some aspects, the first RAT is a Long Term Evolution RAT, the second RAT is a New Radio RAT, and the user equipment is enabled for the non-standalone mode and the standalone mode, and the cell is selected based at least in part on the cell being at least one of an LTE cell that is associated with the New Radio RAT, or a New Radio cell. In some aspects, the first RAT is a Long Term Evolution RAT, the second RAT is a New Radio RAT, and the user equipment is enabled for the standalone mode, and the cell is selected based at least in part on the cell being a New Radio cell. In some aspects, the search is a better Public Land Mobile Network (BPLMN) search.

Process 600 may include additional aspects, such as any single aspect or any combination of aspects described above and/or in connection with one or more other processes described elsewhere herein.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment, comprising:
   determining a mode in which the user equipment is enabled,
      wherein the mode is one of a non-standalone mode, a standalone mode, or a standalone mode and a non-standalone mode;
   determining whether to prioritize a first set of frequencies associated with a first radio access technology (RAT) or a second set of frequencies associated with a second RAT based at least in part on the mode in which the user equipment is enabled,
      wherein the first RAT is different from the second RAT,
      wherein the first RAT is a Long Term Evolution RAT, and
      wherein the second RAT is a New Radio RAT;
   performing a search of the first set of frequencies or the second set of frequencies based at least in part on whether the first set of frequencies or the second set of frequencies is prioritized; and
   providing, by the user equipment and for display, information that indicates that a particular cell, of a set of cells identified in the search, is a associated with the New Radio RAT based at least in part on the user equipment being enabled for one of the non-standalone mode, the standalone mode, or the non-standalone mode and the standalone mode.

2. The method of claim 1, wherein the search is performed for the first set of frequencies and not the second set of frequencies based at least in part on the user equipment being enabled for the non-standalone mode.

3. The method of claim 1, wherein the search is performed for the first set of frequencies and the second set of frequencies based at least in part on the user equipment being enabled for the non-standalone mode and the standalone mode.

4. The method of claim 1, wherein the search is performed for the first set of frequencies before the second set of frequencies based at least in part on the user equipment being enabled for the standalone mode.

5. The method of claim 1, further comprising:
   providing, for display, information that indicates whether the set of cells are associated with the first RAT or the second RAT.

6. The method of claim 1, further comprising:
   providing, for display, information that indicates one or more cellular providers associated with the set of cells.

7. The method of claim 1, further comprising:
   providing, for display, information identifying the set of cells,
      wherein the information is provided in a particular order based at least in part on the mode in which the user equipment is enabled or a possible mode in which the user equipment can be enabled.

8. The method of claim 1,
   wherein the user equipment is enabled for the non-standalone mode, and
   wherein providing the information that indicates that the particular cell is associated with the New Radio RAT comprises:
      providing the information that indicates that the particular cell is an LTE cell that is associated with the NEW Radio RAT based at least in part on the user equipment being enabled for the non-standalone mode.

9. The method of claim 1,
   wherein the user equipment is enabled for the non-standalone mode and the standalone mode,
   wherein a particular cell of the set of cells is at least one of:
      a Long Term Evolution cell that uses the New Radio RAT, or
      a New Radio cell, and
   wherein providing the information that indicates that the particular cell is associated with the New Radio RAT comprises:
      providing, for display, the information that indicates that the particular cell is associated with the New Radio RAT based at least in part on the user equipment being enabled for the non-standalone mode and the standalone mode.

10. The method of claim 1, wherein the user equipment is enabled for the standalone mode, and
   wherein providing the information that indicates that the particular cell is associated with the New Radio RAT comprises:
      providing, for display, information that indicates that the particular cell is associated with the New Radio RAT based at least in part on the user equipment being enabled for the standalone mode.

11. The method of claim 1, further comprising:
   selecting the particular cell, from the set of cells based at least in part on whether the particular cell is a cell of the first RAT or a cell of the second RAT and further based at least in part on a mobile network associated with the particular cell.

12. The method of claim 1, wherein the particular cell is selected based at least in part on whether the user equipment is enabled for the non-standalone mode, the standalone mode, or the standalone mode and the non-standalone mode.

13. The method of claim 1, wherein the user equipment is enabled for the non-standalone mode, and
wherein the particular cell is selected based at least in part on the particular cell being a Long Term Evolution cell that is associated with the New Radio RAT.

14. The method of claim 1, wherein the user equipment is enabled for the non-standalone mode and the standalone mode, and
wherein the particular cell is selected based at least in part on the particular cell being at least one of:
a Long Term Evolution cell that is associated with the New Radio RAT, or
a New Radio cell.

15. The method of claim 11, wherein user equipment is enabled for the standalone mode, and
wherein the particular cell is selected based at least in part on the particular cell being a New Radio cell.

16. The method of claim 1, wherein the search is a better Public Land Mobile Network (BPLMN) search.

17. A user equipment for wireless communication, comprising:
a memory; and
one or more processors operatively coupled to the memory, the memory and the one or more processors configured to:
determine a mode in which the user equipment is enabled,
wherein the mode is one of a non-standalone mode, a standalone mode, or a standalone mode and a non-standalone mode;
determine whether to prioritize a first set of frequencies associated with a first radio access technology (RAT) or a second set of frequencies associated with a second RAT based at least in part on the mode in which the user equipment is enabled,
wherein the first RAT is different from the second RAT,
wherein the first RAT is a Long Term Evolution RAT, and
wherein the second RAT is a New Radio RAT;
perform a search of the first set of frequencies or the second set of frequencies based at least in part on whether the first set of frequencies or the second set of frequencies is prioritized; and
provide, by the user equipment and for display, information that indicates that a particular cell, of a set of cells identified in the search, is associated with the New Radio RAT based at least in part on the user equipment being enabled for one of the non-standalone mode, the standalone mode, or the non-standalone mode and the standalone mode.

18. The user equipment of claim 17, wherein the search is performed for the first set of frequencies and not the second set of frequencies based at least in part on the user equipment being enabled for the non-standalone mode.

19. The user equipment of claim 17, wherein the search is performed for the first set of frequencies and the second set of frequencies based at least in part on the user equipment being enabled for the non-standalone mode and the standalone mode.

20. The user equipment of claim 17, wherein the search is performed for the first set of frequencies before the second set of frequencies based at least in part on the user equipment being enabled for the standalone mode.

21. The user equipment of claim 17, wherein the one or more processors are further configured to:
provide information that indicates whether the set of cells are associated with the first RAT or the second RAT.

22. The user equipment of claim 17, wherein the one or more processors are further configured to:
provide information that indicates one or more cellular providers associated with the set of cells.

23. The user equipment of claim 17, wherein the one or more processors are further configured to:
provide information identifying the set of cells, wherein the information is provided in a particular order based at least in part on the mode in which the user equipment is enabled or a possible mode in which the user equipment can be enabled.

24. The user equipment of claim 17, wherein the one or more processors are further configured to:
select the particular cell, from the set of cells based at least in part on whether the particular cell is a cell of the first RAT or a cell of the second RAT and further based at least in part on a mobile network associated with the particular cell.

25. The user equipment of claim 17, wherein the particular cell is selected based at least in part on whether the user equipment is enabled for or capable of being enabled for the non-standalone mode, the standalone mode, or the standalone mode and the non-standalone mode.

26. The user equipment of claim 17, wherein the search is a better Public Land Mobile Network (BPLMN) search.

27. A non-transitory computer-readable medium storing one or more instructions for wireless communication, the one or more instructions comprising:
one or more instructions that, when executed by one or more processors of a user equipment, cause the one or more processors to:
determine a mode in which the user equipment is enabled,
wherein the mode is one of a non-standalone mode, a standalone mode, or
a standalone mode and a non-standalone mode;
determine whether to prioritize a first set of frequencies associated with a first radio access technology (RAT) or a second set of frequencies associated with a second RAT based at least in part on the mode in which the user equipment is enabled,
wherein the first RAT is different from the second RAT,
wherein the first RAT is a Long Term Evolution RAT, and
wherein the second RAT is a New Radio RAT;
perform a search of the first set of frequencies or the second set of frequencies based at least in part on whether the first set of frequencies or the second set of frequencies is prioritized; and
provide, by the user equipment and for display, information that indicates that a particular cell, of a set of cells identified in the search, is associated with the New Radio RAT based at least in part on the user equipment being enabled for one of the non-standalone mode, the standalone mode, or the non-standalone mode and the standalone mode.

28. The non-transitory computer-readable medium of claim 27, wherein the one or more instructions, when executed by the one or more processors, further cause the one or more processors to:
provide information that indicates whether the set of cells are associated with the first RAT or the second RAT.

29. The non-transitory computer-readable medium of claim 27, wherein the one or more instructions, when executed by the one or more processors, further cause the one or more processors to:
select the particular cell from the set of cells based at least in part on whether the particular cell is a cell of the first RAT or a cell of the second RAT and further based at least in part on a mobile network associated with the particular cell.

30. An apparatus for wireless communication, comprising:
means for determining a mode in which the apparatus is enabled,
wherein the mode is one of a non-standalone mode, a standalone mode, or a standalone mode and a non-standalone mode;
means for determining whether to prioritize a first set of frequencies associated with a first radio access technology (RAT) or a second set of frequencies associated with a second RAT based at least in part on the mode in which the apparatus is enabled,
wherein the first RAT is different from the second RAT,
wherein the first RAT is a Long Term Evolution RAT, and
wherein the second RAT is a New Radio RAT;
means for performing a search of the first set of frequencies or the second set of frequencies based at least in part on whether the first set of frequencies or the second set of frequencies is prioritized; and
means for providing, by the apparatus and for display, information that indicates that a particular cell, of a set of cells identified in the search, is associated with the New Radio RAT based at least in part on the apparatus being enabled for one of the non-standalone mode, the standalone mode, or the non-standalone mode and the standalone mode.

* * * * *